United States Patent [19]

Ogino et al.

[11] Patent Number: 5,011,277

[45] Date of Patent: Apr. 30, 1991

[54] MULTI-SCREEN PROJECTOR

[75] Inventors: Masanori Ogino, Yokohama; Yoshiaki Iwahara, Yokosuka; Yuzo Tamura, Yokohama; Shoji Kuroda, Odawara, all of Japan

[73] Assignee: Hitachi, Ltd., Tokyo, Japan

[21] Appl. No.: 521,015

[22] Filed: May 9, 1990

[30] Foreign Application Priority Data

May 10, 1989 [JP] Japan ................................ 1-114906

[51] Int. Cl.$^5$ .............................................. G03B 21/60
[52] U.S. Cl. ....................................... 353/94; 358/237; 350/125; 350/128
[58] Field of Search ................... 353/94, 38; 358/231, 358/60, 237; 350/128, 127, 129, 125

[56] References Cited

U.S. PATENT DOCUMENTS 4,536,056  8/1985  Oguino .................................. 350/128
4,866,530  9/1989  Kalua ................................... 358/237

FOREIGN PATENT DOCUMENTS 3416015  10/1985  Fed. Rep. of Germany ........ 353/94

*Primary Examiner*—Harry N. Haroian
*Attorney, Agent, or Firm*—Antonelli, Terry, Stout & Kraus

[57] ABSTRACT

Unit projectors whose number is n×m are arranged in n rows and m columns like a matrix. Unit screens whose number is n×m are arranged so that they as a whole form an enormous transmissive screen. Each unit screen is composed of the three layers of a front sheet on a Fresnel sheet on a re-inforcing sheet facing an observer. A front sheet is provided with the shape having a one-dimensional curvature which causes the peripheries of the front sheet and a re-inforcing sheet to be apart from each other when the center of the front sheet is brought in touch with that of the re-inforcing sheet in the un-loaded state. Wires smaller in diameter than the pixel size are connected to the left and right sides of the front sheet, springs provide the wires with tension with support members as their support, and the force of the springs is thus provided by way of the wires for the front sheet so that the left and right sides of the front sheet are pressed on the re-inforcing sheet by way of the Fresnel sheet. The boundary part between the unit screens is reduced into a minimum.

26 Claims, 15 Drawing Sheets

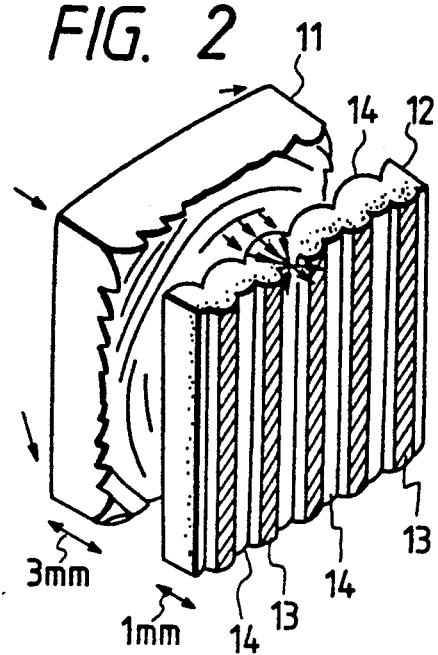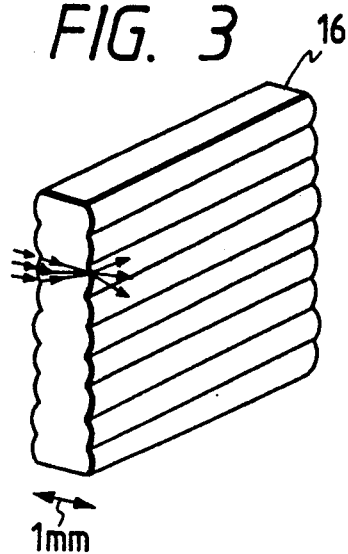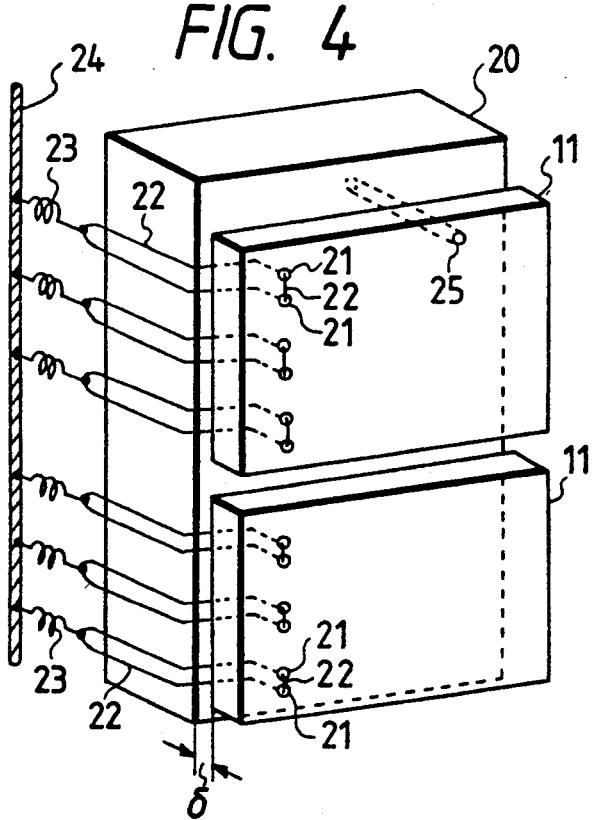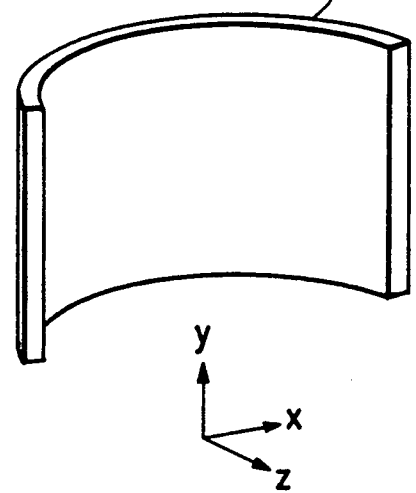

MULTI-SCREEN PROJECTOR

BACKGROUND OF THE INVENTION

The present invention relates to a multi-screen projector, and is particularly concerned with a transmissive screen device to be used for a multi-screen projector.

A multi-screen projector is a projector having an enormous screen composed by arranging n unit projectors in a vertical direction and m unit projectors in a horizontal direction. A multi-screen projector with two rows and two columns of unit projectors is illustrated in FIG. 1. In FIG. 1, each of the reference numerals 1, 2, 3 and 4 denotes a unit projector, and each of reference numerals 5, 6, 7 and 8 a transmissive unit screen.

Conventional multi-screen projectors have been a mere stack of ordinary unit TV projectors for home use which incorporate unit screens. Therefore, a nontransparent structural body has been in existence in the shaded part designated by reference numeral 9, and the shadow due to the nontransparent structural body has been unavoidable in that portion of the enormous screen which is essential for display of images. When a unit screen is about 800 mm wide, the width of the shadow has been about 8 mm or more, i.e. 1% or more of that of the unit screen. Since the pixel size for a unit TV projector is about 0.2% of the width of the unit screen, the above shadow whose width is 1% or more of that of the unit screen is equivalent to about 5 pixels or more.

FIG. 2 illustrates a typical composition of a unit screen with the diagonal about 40 inches. FIG. 2 is an example of a two-sheet composition. To an observer, a Fresnel sheet 11 is at the back and a front sheet 12 in the front. The Fresnel sheet 11, about 3 mm thick, converts the incident light macroscopically diverging which comes from a projection lens behind it into collimated projection light. The projection lens is not illustrated in FIG. 2. The Fresnel sheet, in other words, functions the same way as a convex lens.

The front sheet 12 has the formations of vertical lenticular-stripes 14 and vertical black-stripes 13. The lenticular stripes microscopically diffuse the light in the horizontal direction, namely, increase the horizontal audience coverage angle. A detailed example of its composition is described in the U.S. Pat. No. 4,536,056.

FIG. 3 illustrates a lenticular sheet 16 which vertically diffuses the light. As in FIG. 3, horizontal lenticular-stripes are formed on the surfaces of light incidence and projection of the lenticular sheet so that the light can be microscopically diffused in the vertical direction. The lenticular sheet is used between the Fresnel sheet 11 and the front sheet 12 both illustrated in FIG. 2, so the three sheets composes one whole sheet.

Incidentally, a method of doing without a lenticular sheet 16 has been in use by admixing diffuser elements which microscopically and randomly diffuse the light, for example, particles of $SiO_2$ with the front sheet in FIG. 2.

SUMMARY OF THE INVENTION

Sheets 11, 12 and 16 in FIGS. 2 and 3 are all composed of a transparent resin belonging to a metacrylic resin or polystyrene resin. Therefore, they expand and contract according to the ambient temperature with the temperature coefficient about 60 PPM/°C.

They also expand and contract according to the change of the ambient humidity with the line expansion rate about 400 PPM for a metacrylic resin sheet or 100 PPM for a polystyrene resin sheet per 10% increase of the relative humidity.

Sometimes a change in humidity, due to the large time constant, is transiently responded by an unbalanced state of the water absorption profile of a sheet in the direction of depth. In such a case, the front sheet 12 deforms into a curved shape. To cope with this problem, it has been necessary to prior art for each unit screen to be retained by a frame fixed in the area denoted by reference numeral 9 in FIG. 1 (and along the outer edge of the unit screens put together). That is the reason the occurrence of a shadow in great width has been unavoidable between unit screens.

The shadow has a disadvantage of impairing the continuity and unity of the enormous screen.

An object of the present invention, therefore, is to provide a multi-screen projector whose shadow, i.e. a default band along peripheries of the unit screens is minimized.

To achieve the above object, the following means are adopted.

For a transmissive screen device of the present invention, two or more sheets are used after overlapped.

At least particular two sheets out of the two or more sheets are formed with the one-dimensional curvature for the unloaded state varying between the sheets. In the concrete, they are formed so that their edges can be apart from each other when their centers are in contact with each other in the unloaded state.

In addition, a force directed for binding the two sheets is applied to one of the two sheets by a spring.

The spring absorbs the expansion and contraction of the sheet in the front or that at the back due to a change in the environment, continuing to provide a force for binding both sheets. Therefore, it is not necessary to use the screen frame which has been indispensable for prior art. Thus, the shadow of the default band along peripheries of the unit screens can be reduced to a minimum in width. At the same time, a multi-screen projector resistant to changes in the environment can be constructed.

BRIEF DESCRIPTION OF THE DRAWINGS

In the accompanying drawings:

FIGS. 2 and 3 are views of the composing elements of a unit screen;

FIG. 4 is a perspective view of the principal part of the first embodiment of the present invention;

FIG. 5 is a perspective view of the shape of the Fresnel sheet illustrated in FIG. 4 in the unloaded state;

DETAILED DESCRIPTION OF EMBODIMENTS

Figure 1:
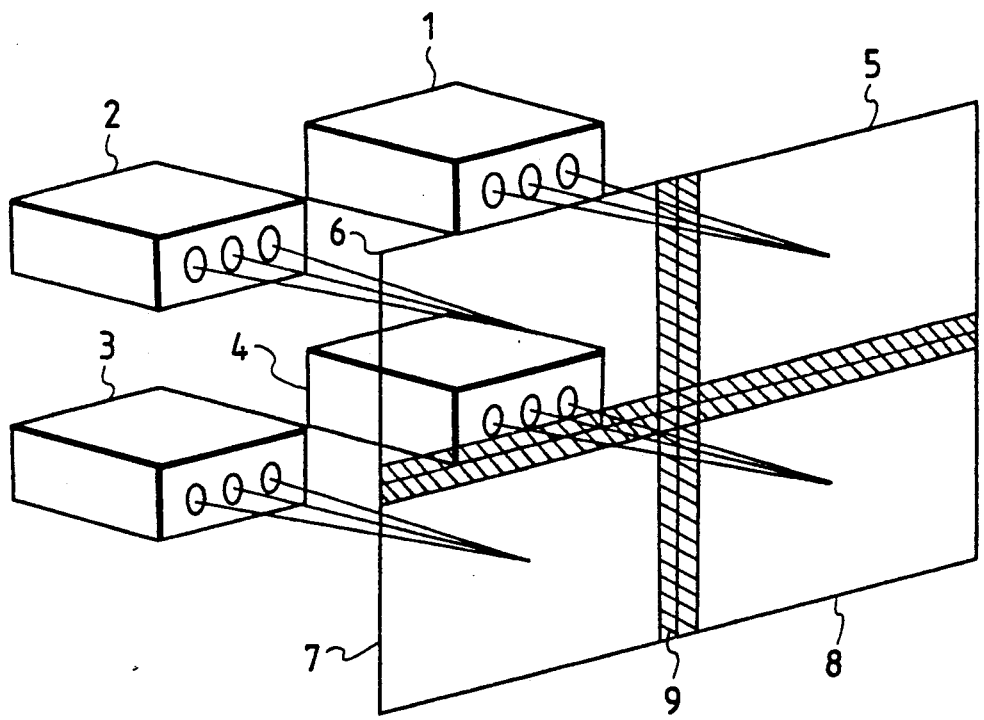
FIG. 1 is a view of a conventional multi-screen.

The first embodiment of the present invention is shown in FIG. 4.

FIG. 4 illustrates two of the unit screens composing the multi-screen. In FIG. 4, a reference numeral 11 denotes the same Fresnel sheet as 11 does in FIG. 2. The dimensions of the sheet are about 40 inch size, i.e. 800 mm in width, 600 mm in height and about 1 to 3 mm in depth. The Fresnel sheet 11 is formed as depicted in FIG. 5 so that it can have an one-dimensional curvature with the observer's side inside the curve. It is known that the method of providing the one-dimensional curvature is to forcibly apply a one-dimensional curvature to an ordinary plane Fresnel sheet and keep the sheet in the state in the environment having a temperature of plastic deformation about 80° C. or higher. For the radius of the one-dimensional curvature, somewhat around 10 m or 30 m is selected, and the details of the one-dimensional curvature are described later.

Reference numerals 21 and 22 in FIG. 4 denote a hole formed in the Fresnel sheet and a wire, respectively. The material for the wire is a metal such as stainless steel or plastic such as nylon. Both single wires and stranded wires are permitted, but wires whose outer diameter is smaller than the size of a pixel on the display are for use. The wire, penetrating through the hole 21, provides the tension in a direction so as to bind the Fresnel sheet and a re-inforcing sheet 20. The re-inforcing sheet 20 is made of such a transparent resin as a metacrylic resin or polystyrene resin.

A reference numeral 23 denotes a coil spring which is normally composed of a metal wire. A reference numeral 24 denotes a rigid support body which is composed of a metal or plastic body. The coil spring 23 provides tension for the wire 22, its support being the rigid support body 24. The tension is conveyed along the wire to the Fresnel sheet 11, binding the left edge of the Fresnel sheet to the re-inforcing sheet 20.

The rigid support body 24 is located in a free space not to cause any shadow on the screen. The edge of the free space is illustrated as a shaded part 42 in FIG. 12 referred to later.

Though FIG. 4 illustrates only the supporting structure at the left edge of unit screens, the same structure is applied to the upper, lower and right edge of a unit screen. The omission in FIG. 4 is because of simplification of a drawing.

Note that at the upper and lower edges, a wire penetrates through a hole 25 in both a Fresnel sheet and a re-inforcing sheet. Though many holes 25 are formed there, FIG. 4 shows only one hole for the purpose of drawing simplification.

In front of the two Fresnel sheets 11 illustrated in FIG. 4, there is located a front sheet (not shown) large enough to cover the two Fresnel sheets. Vertical lenticular-stripes are formed on the front and rear surfaces of this front sheet, and vertical black-stripes on the front surface, just as in the case of the front sheet in FIG. 2.

The below description is about the one-dimensional curvature to be provided beforehand for a Fresnel sheet 11. The one-dimensional curvature is established to prevent any deformation of a Fresnel sheet in the non-uniform water absorption state. As a result of minute analysis of a water absorption model for plastic material, the inventor found out that the water absorption can be expressed in an equivalent circuit as shown in FIG. 6.

Figure 6:
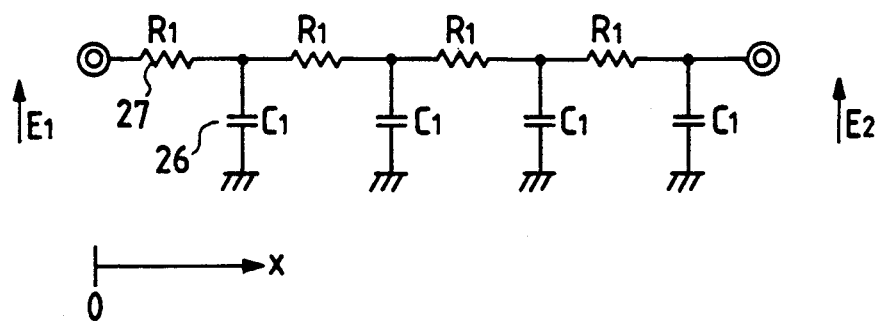
FIG. 6 is an equivalent circuit diagram illustrating the water absorption of screen materials.

In FIG. 6, reference numerals 26 and 27 denote a capacitor whose capacitance is $C_l$ and a resistor whose resistance is $R_l$ respectively. Those values are defined by the following equations when the voltage is associated with the water vapor pressure E [N/m²] and the current with the water stream density I [kg/m²sec]:

$$C_1 = \frac{\text{Water absorption density}}{\text{Water vapor pressure}} \left[ \frac{kg/m^3}{N/m^2} \right] \\ R_1 = \frac{\text{Gradient of water vapor pressure}}{\text{Water stream density}} \left[ \frac{N/m^3}{kg/m^2 sec} \right] \quad (1)$$

where $C_1$ is equivalent to capacitance per unit volume, and $R_1$ to specific resistance. Incidentally, a fundamental MKS unit for $R_1$ is [1/sec]. This implies that the value of $R_1$ indicates the process of collision and scattering of microscopic particles.

Provided that $E_1$ is the water vapor pressure on an observer's side, i.e. the front surface of the Fresnel sheet and $E_2$ is that on the rear surface of the Fresnel sheet, it can be said that FIG. 6 is the expression by an equivalent circuit of a model of water diffusing in the direction of the depth, i.e. the distance between the front and rear surfaces. The diffusion coefficient D, which parameter is often used in organic chemistry, is expressed by:

$$D = \frac{1}{C_1 R_1} \ [m^2/sec] \quad (2)$$

The diffusion coefficient for metacrylic material can be expressed a posteriori by the below equation with the absolute temperature T. The equation is a special example of what is called the equation of Arrhenius.

$$D \approx \frac{(2\ m)^2}{day} \exp\left(\frac{5400° \ K.}{T}\right) \quad (3)$$

$$\approx \frac{(0.3\ mm)^2}{day} \text{ (for the ordinary temperature } T = 300°\ K.)$$

Assuming that the humidity environment changes suddenly in the system illustrated in FIG. 4, namely that the water vapor pressure stepwardly increases by the unit quantity, the front of the Fresnel sheet 11 starts absorbing water immediately after the change. However, since there is a re-inforcing sheet 20 at the back, the rear of the Fresnel sheet can be considered to be insulated. The time response of the water absorption state of the Fresnel sheet to the environment change can be found out, the input $E_1$ in FIG. 6 being a unit step input. The solution for it is given by:

$$E(z,t) = \left. \int_{\beta = \Delta}^{\beta = \infty} \frac{2}{\sqrt{\pi}} e^{-\beta^2} d\beta \right\} \quad (4)$$

Where $\Delta = \frac{z}{2\sqrt{Dt}}$

In the above equation, z is the coordinate (distance) in the direction of depth with the origin on the front of the Fresnel sheet, t is the number of days elapsed and E (z, t) is the water vapor pressure inside the Fresnel sheet with z, t.

Figure 7:
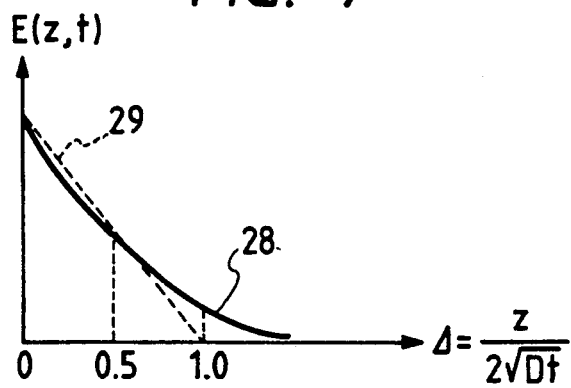
FIG. 7 is a graph illustrating the step response of screen materials to the water absorption.

The graph of E (z, t) in equation (4) is shown in FIG. 7. In FIG. 7, the continuous line 28 is the graph, and the dotted line 29 is its linear approximation. It will be observed from the equation for the abscissa $\Delta$ in FIG. 7 that as four times of the number of days t elapse, the depth of water absorption z doubles. Assuming the depth of the Fresnel sheet to be about 3 mm, the number of days t water takes to reach the rear of the Fresnel sheet is, as observed from FIG. 7, given by solving the following equation:

$$1 = \Delta = \frac{3\ mm}{2\sqrt{Dt}} \quad (5)$$

$$\therefore t = \frac{1.5\ mm}{\sqrt{D}} = 5 \text{ days}$$

This suggests that in five days the front of the Fresnel sheet becomes in the state of water absorption equilibrium while the rear of the sheet starts water absorption.

A stepward environmental change of 10% in relative humidity can occur to the Fresnel sheet in indoor use. It is known that ordinary metacrylic material and the material mixed with polystyrene expand about 500 PPM and about 100 PPM respectively in response to the 10% change in relative humidity.

The front surface being expanded about 100 PPM in comparison with the rear surface, the Fresnel sheet forces a change of its own shape in a direction for inverting the shape illustrated in FIG. 5. The amount of the change in shape is given by the following equation, converted into the increment $\Delta K$ of the one-dimensional curvature K, according to strength of materials:

$$\Delta K = \frac{\epsilon}{l}(1 + \sigma) \quad (6)$$

$$\approx \frac{1000\ PPM}{3\ mm}(1 + 0.4)$$

$$\approx \frac{1}{21\ m}$$

In the above equation, $\epsilon$, l and $\sigma$ are expansion, depth and Poisson's ratio, respectively.

It will be observed from the above equation that if the one-dimensional curvature in the unloaded state in FIG. 5 is about 1/21 m or more, the shape of the Fresnel sheet in FIG. 5 is ensured against any inversion even when the stress due to difference in the strain of front surface versus rear surface occurs on account of a change in the environment. Therefore, the composition in FIG. 4 prevents any inconvenience caused by a protrusion in the center of the Fresnel sheet.

So much for the description of required amount of the one-dimensional curvature to be provided in advance for the Fresnel sheet 11. The description below is about more desirable conditions, though not indispensable, as the specification of the one-dimensional curvature K.

Figure 8:
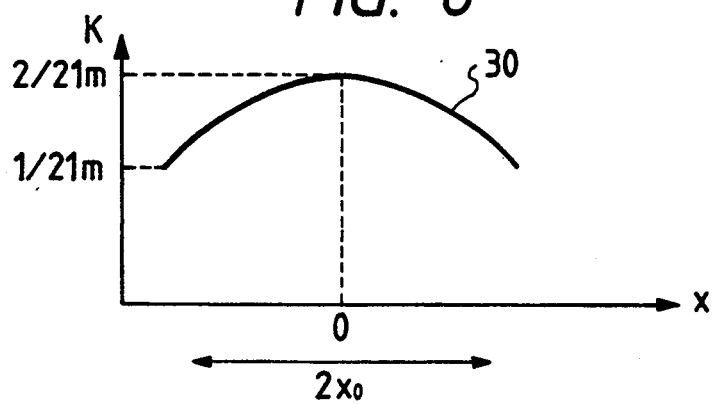
FIG. 8 is a graph showing a desirable example of curvature distribution for screen materials in the unloaded state.

When the one-dimensional curvature K is a particular constant not related to horizontal direction coordinate x, the Fresnel sheet in FIG. 5 has a shape of vertical simple cylinder. However, it is desirable that the curvature K should be high in the center and low on the periphery as indicated in FIG. 8. K in FIG. 8 is given by:

$$K = \frac{2}{21\ m} - \frac{1}{21\ m}\left(\frac{x}{x_0}\right)^2 \quad (7)$$

In the above equation, $2x_0$ is the width of a unit screen. If the polarity of z is defined by specifying a direction from the Fresnel sheet toward the observer as positive, the curvature K is defined by:

$$K = \frac{d^2 z}{(dx)^2}$$

Therefore, the solution of z (x) is:

$$Z = \frac{x^2}{21\text{ m}} - \frac{1}{12.21\text{ m}} \left(\frac{x}{x_0}\right) \quad (8)$$

The reason that the second term on the right side of equation (7) is given, namely that the differential coefficient of the second order for the curvature is given an opposite polarity to that of the first term of the right side of equation (7) indicating a principal one-dimensional curvature is because of the improvement of the binding of the Fresnel sheet 11 and re-inforcing sheet 20 in FIG. 4. When the second term on the right side of equation (7) is not in existence, namely in the case of a simple cylinder, binding is provided only for the left and right edges the Fresnel sheet 11 and not for the center of the sheet. Giving the second term on the right side of equation (7) allows binding to be provided also for the center of the Fresnel sheet 11. Thus, a screen more preferable in appearance can be composed.

So much for the description of the desirable sufficient conditions to be possessed by the shape of the Fresnel sheet in the unloaded state.

Relating next to tension necessary for a coil spring 23 in FIG. 4, the tension is established in conformity to a condition of reducing the spacing * between the Fresnel sheet 11 and the re-inforcing sheet 20 into a small value (about 1 mm) permissible in respect of the appearance. Let the tension at the left edge per unit length be $T_1$, the Young's modulus of the Fresnel sheet be E and the above noted curvature at the left edge K, then according to strength of materials the following expression must be fulfilled:

$$\delta = \frac{K^3}{2} \left(\frac{Eh^3}{12T_1}\right)^2 \leq 1 \text{ mm} \quad (9)$$

$$\therefore T_1 \geq \frac{1}{12} \sqrt{\frac{K_1^3}{2 \text{ mm}} Eh^3}$$

$$\approx \frac{1}{12} \sqrt{\frac{1}{2 \text{ mm } (21 \text{ m})^3} \frac{3000 \text{ N}}{(\text{mm})^2} (3 \text{ mm})^3}$$

$$\approx 1.6 \text{ N/m}$$

The tension of the coil spring 23 in FIG. 4 needs to be about 1.6N or more per unit length of the Fresnel sheet. The above description is for the case that difference in the strain of front surface versus rear surface is 100 PPM. In the case of the difference being 400 PPM, equations (6) and (9) give 1/5 m and 13 N/m respectively.

When ordinary steel springs or a stainless steel springs are used, a total of three such springs with the diameter of the wire forming them about 0.3 mm for each left side (about 0.6 m long) need to be used to obtain a tension of about 10N. Namely, the tension is about 16N for 1 m. Therefore, the above condition can be achieved easily.

So much for the description of necessary tension. The description below is about the necessary dynamic range of the coil spring.

The dynamic range necessary for the coil spring can be determined by the difference in expansion and contraction between the Fresnel sheet 11 and the re-inforcing sheet 20 as observed from the composition in FIG. 4. Judging from the above noted dependency on humidity, it can be said that the difference in expansion and contraction is within about ±500 PPM. It is about ±0.3 mm when the half width of a unit screen $x_0$ is about 0.6 m as in the above noted example. Therefore, a small spring will meet the requirement.

So much for the description of the Fresnel sheet and the re-inforcing sheet which are components of the first embodiment of the present invention.

Figure 9:
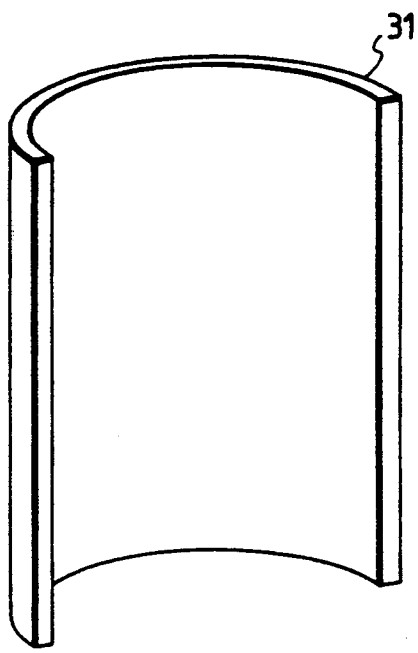
FIG. 9 is a perspective view of the shape of the front sheet in the unloaded state in the second embodiment of the present invention.

FIG. 9 illustrates the composition of the front sheet 31 for use in the second embodiment of the present invention. When in use, the front sheet 31 is bound with the front surface of the Fresnel sheet as described later.

FIG. 9 illustrates the shape of the front sheet 31 in the unloaded state. Since the depth of the front sheet 31 is about 1 mm, the sheet is provided with a higher curvature in the unloaded state according to equation (6). The front sheet 31 has vertical lenticular-stripes formed on the rear and front surfaces and vertical black-stripes formed on the front surface as the front sheet in FIG. 2 does.

Usually, the front sheet 12 in FIG. 2 is produced by the molding method of extrusion roll. Thus, it is easy to produce a long front sheet. That is why the front sheet 31 is depicted as elongated along the vertical direction in FIG. 9. It is equivalent to a couple of unit screens 5 and 8 or 6 and 7 shown in FIG. 1. Generally, it is equivalent to a column in a composition of m rows and n columns.

Figure 10:
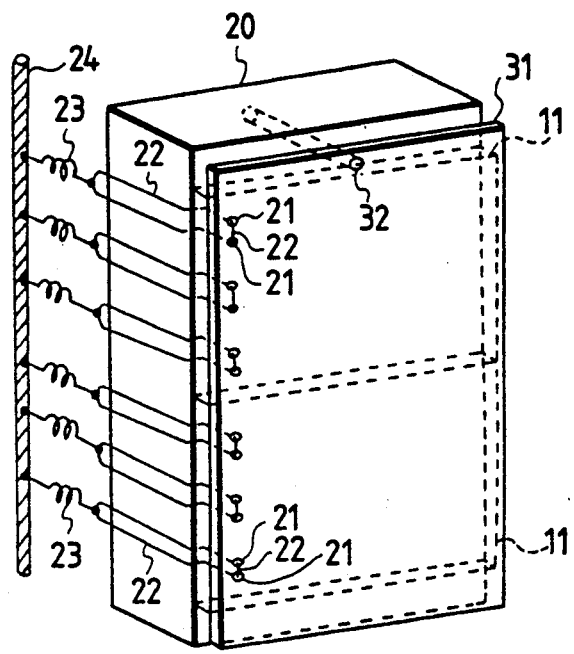
FIG. 10 is a perspective view of the principal part of the second embodiment of the present invention.

FIG. 10 illustrates the structure of the left edge of the combination of the front sheet 31 and the re-inforcing sheet 20 and the Fresnel sheet 11. In FIG. 10, the numbers 22, 23 and 24 denote a wire, coil spring and rigid support body respectively. Another number 21 denotes a hole formed in the front sheet 31 and Fresnel sheet 11. The wire 22, penetrating through the hole 21 and running along an outside of the re-inforcing sheet 20, is connected to a coil spring 23. Therefore, the tension of the coil spring provides a component of force for each of the front sheet 31 and Fresnel sheet 11 in a direction so as to bind them to the re-inforcing sheet 20.

Though FIG. 10 illustrates only the supporting structure at the left edge, the same structure is employed also at the right edge. A reference numeral 32 in FIG. 10 denotes a hole formed through the front sheet 31 and the re-inforcing sheet 20. Running a thread rod (not illustrated) through the hole allows the front sheet 31 to be fixed and hung on the re-inforcing sheet 20. Note that the upper and lower edges of the Fresnel sheet 11 are supported by wires running through the holes 25 in FIG. 4 which have been described earlier though the edges are invisible in FIG. 10.

Figure 11:
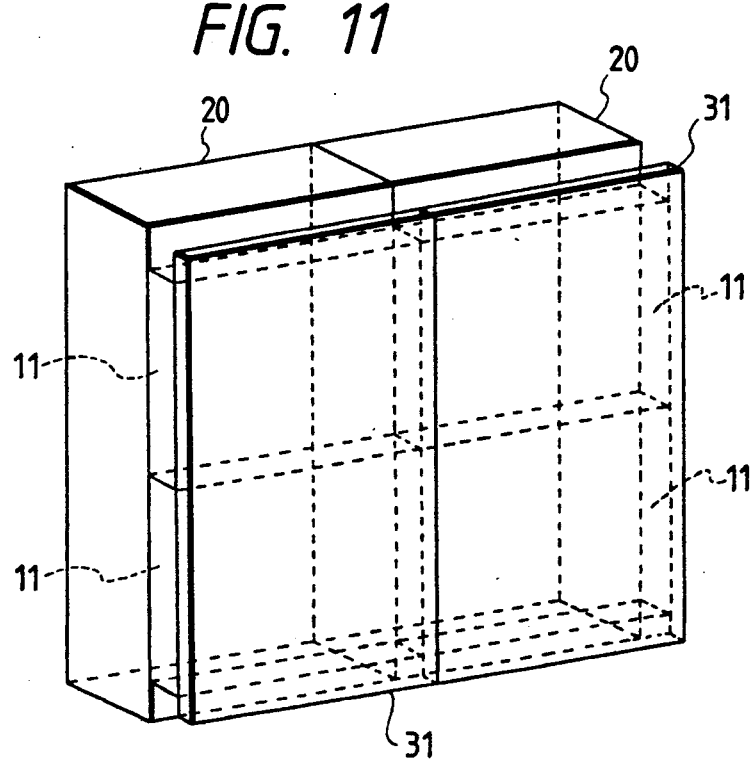
FIG. 11 is a perspective view of the whole multi-screen in the second embodiment of the present invention.

FIG. 11 illustrates the multi-screen of the second embodiment of the present invention. In FIG. 11, a reference numeral 20 denotes an elongated re-inforcing sheet for each column, 31 an elongated front sheet for each column, and 11 a unit Fresnel sheet about 40 inch size. The supporting structure among the sheets has been described earlier, so it is not illustrated in FIG. 11.

So much for the description of the second embodiment of the present invention.

The second embodiment has been the case that the macroscopic configuration of an enormous screen of n rows and m columns is nearly plane. The macroscopic configuration can be of concave cylinder or of convex cylinder according to use.

Figure 12:
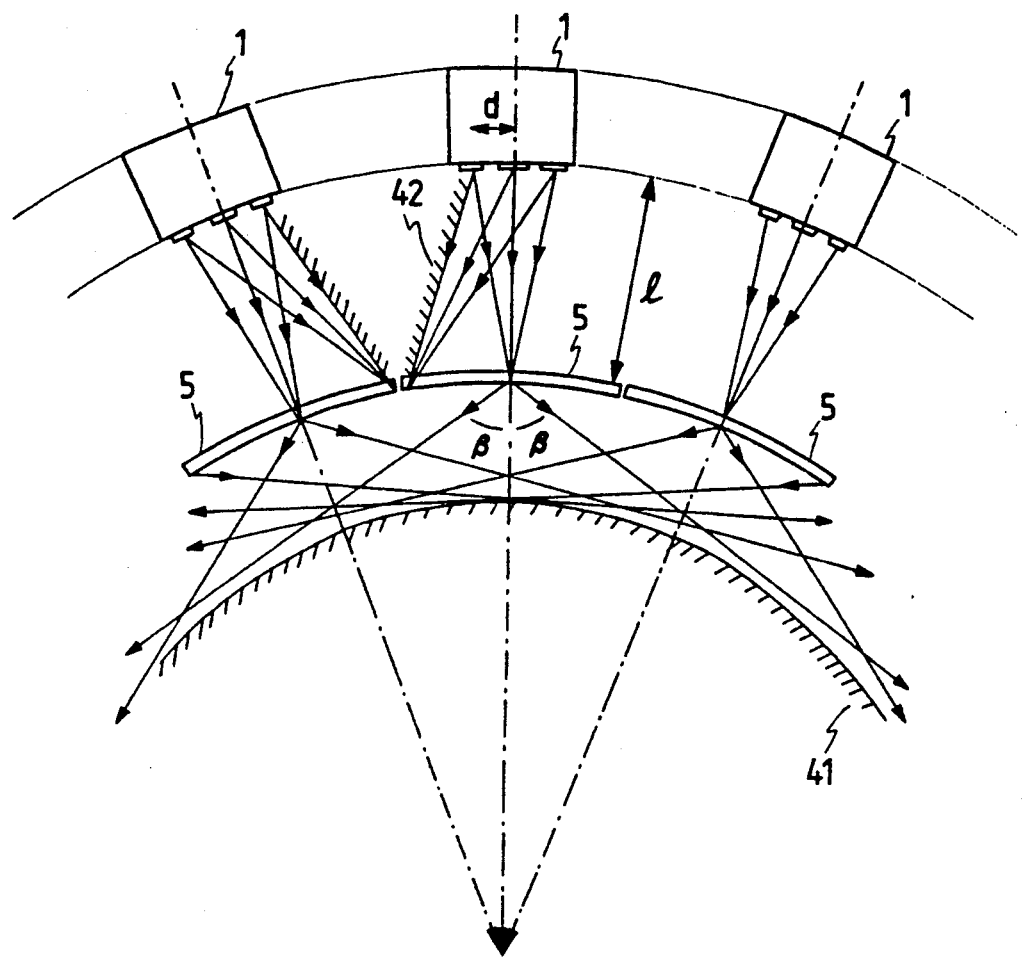
FIG. 12 is a plan view of the third embodiment of the present invention.

FIG. 12 illustrates the third embodiment of the present invention. FIG. 12 shows the case that the macroscopic configuration is of concave cylinder and is a horizontal sectional view from above of a row of the multi-screen projector. A reference numeral 1 denotes each of three columns of projectors, and a reference numeral 5 each of three columns of unit screens. The unit screen 5 is, as in the second embodiment, composed of a unit Fresnel sheet 11, the elongated front sheet 31, re-inforcing sheet 20, wires 22, coil springs 23 and rigid support bodies 24 all shown in FIG. 10. In the third embodiment, the re-inforcing sheet 20 is formed into a concave shape, facing the observer. The horizontal audience coverage angle of each screen is represented by $\beta$ in FIG. 12. $\beta$ is about 60° for an ordinary transmissive screen. The screen is seen bright from the internal side of the horizontal audience coverage angles both side by side and dark from the external side of the angles. The shaded part 41 denotes an area of good observation.

The horizontal audience coverage angle $\beta$ when any point in the good observation area is seen from any location in the screen is not more than ±60°, an arm of the angle being the normal line of the screen. Then the whole multi-screen is seen uniformly bright. At the same time, it has little brightness difference between left and right unit-screens along their boundaries. The shaded part 42 in FIG. 12 denotes the free space where no light ray passes from the projectors. Thus, any body in this area is free from throwing a shadow on the screen. The rigid support body 24 described earlier when referring to FIGS. 10 and 4 is located in the free space.

In the third embodiment, columns of the composition can be added to in order to compose a dome-type circular display.

So much for the description of the third embodiment.

Figure 13:
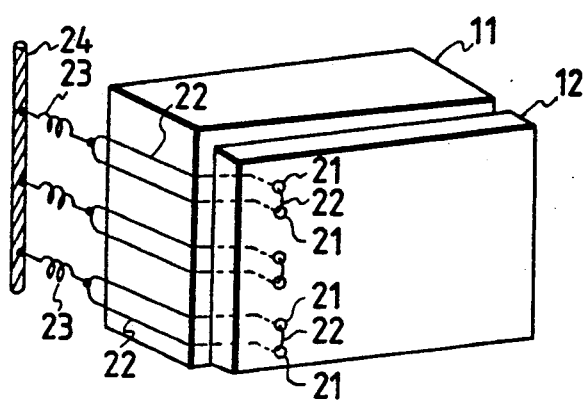
FIG. 13 is a perspective view of the principal part of the fourth embodiment of the present invention.
Figure 14:
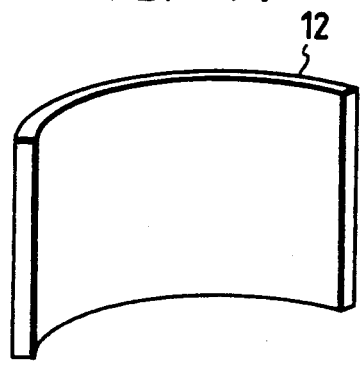
FIG. 14 is a perspective view of the shape of the front sheet in the unloaded state in the fourth embodiment of the present invention.

When the present invention is applied to a horizontally long display of one row and m columns, the re-inforcing sheet 20 can be omitted. This is the fourth embodiment, which is illustrated in FIG. 13. In FIG. 13, a reference numeral 11 denotes a unit Fresnel sheet, and 12 a unit front sheet. Reference numerals 21, 22, 23 and 24 denote, as in FIG. 4, a hole, wire, coil spring and rigid support body respectively. For the front sheet 12, a sheet of the shape in the unloaded state is used which is illustrated in FIG. 14. The principle in the shape is the same as that described using equations (1) to (9).

Vertical lenticular-stripes are formed on the front and rear surfaces of the front sheet 12 illustrated in FIG. 13, and vertical black-stripes on the front surface, just as in the case of the front sheet in FIG. 2.

So much for the description of the fourth embodiment.

The below description is about the variations of the end of a wire or a coil spring which are the principal part of the present invention. The variations are illustrated in FIGS. 15(a) to 15(f).

Each of FIGS. 15(a), 15(b), 15(c), 15(d), 15(e) and 15(f) is a horizontal sectional view of a boundary part between two unit-screens adjacent to each other in the horizontal direction (i.e. left and right unit-screens). In FIGS. 15(a) to 15(f), reference numerals 20, 11, 31, 22, 23 and 24 denote, as noted above, an elongated re-inforcing sheet, unit Fresnel sheet, elongated front sheet, wire, coil spring and rigid support body, respectively.

Figure 15A:
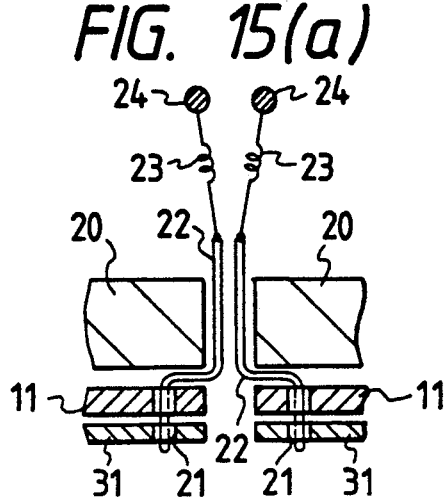
FIGS. 15(a), 15(b), 15(c), 15(d), 15(e) and 15(f) are horizontal sectional views of the screen, illustrating variations of wire and coil spring, respectively.
Figure 15B:
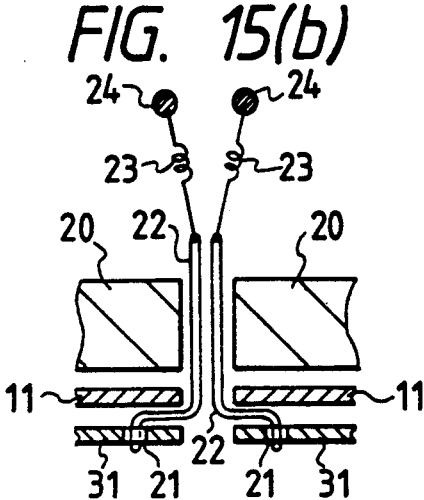

FIG. 15(a) depicts the same structure as the above described structure in FIG. 10. FIG. 15 (b) depicts a variation having the omission of holes for wires in the left and right edges of the unit Fresnel sheet. In both FIG. 15(a) and FIG. 15(b), the elongated front sheet 11 is provided actually with a pair of holes 21 for wires for every coil spring 23 as illustrated in FIG. 10, but the figures indicate only one hole 21 for each elongated front sheet because they are horizontal sectional views.

Figure 15C:
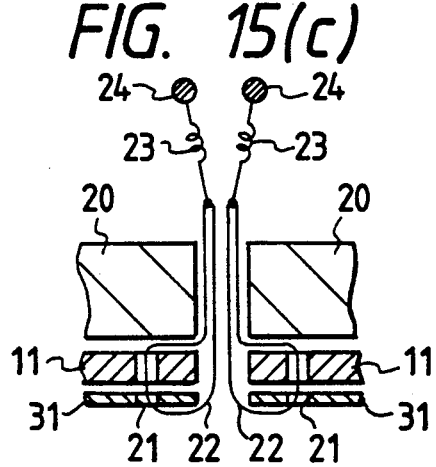
Figure 15D:
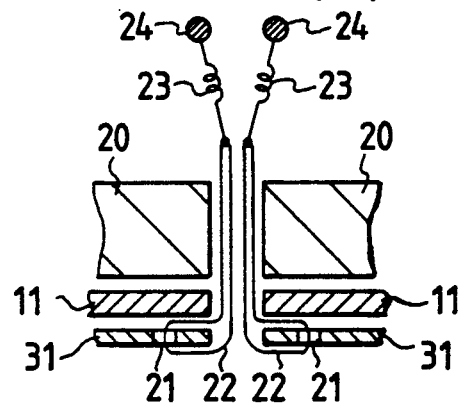

FIG. 15(c) illustrates a variation where a unit Fresnel sheet 11 and an elongated front sheet 31 are provided with one hole for a wire for every coil spring. FIG. 15(d) illustrates a variation having no holes for wires in the left and right edges of a unit Fresnel sheet 11.

Figure 15E:
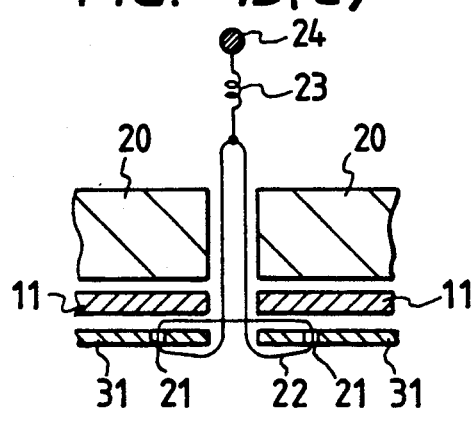

FIG. 15(e) illustrates a variation where the wire 22, coil spring 23 and rigid support body 24 for binding the left edges of the sheets 31, 11 and 20 composing the right screen with each other are also used for binding the right edges of the sheets 31, 11 and 20 composing the left screen with each other.

Figure 15F:
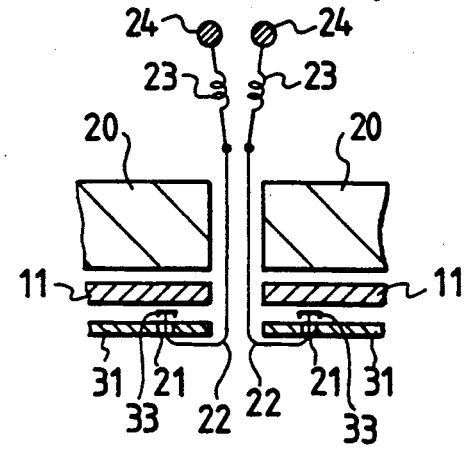
Figure 16:
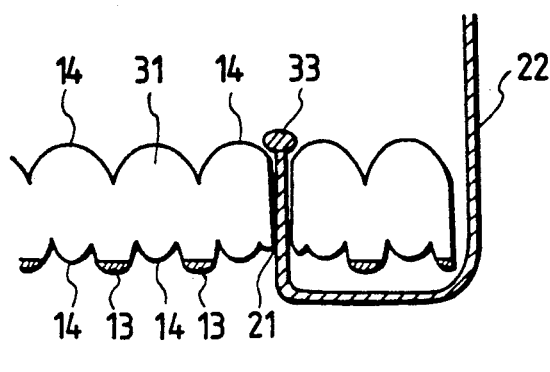
FIG. 16 is an enlarged view of part of FIG. 15(f)

FIG. 15(f) illustrates a structure where the end of the wire 22 is mounted with a head 33 whose material is tin or lead. Its enlarged detail is illustrated in FIG. 16. In FIG. 16, reference numerals 13 and 14 denote vertical black-stripes and vertical lenticular-stripes which are the same as in FIG. 2 and described earlier respectively. A hole 21 is formed just through the black stripe.

Any of the variations in FIGS. 15(a) to 15(f) allows the tension of the coil spring 23 to be conveyed to the front sheet 31 by way of the wire 22 and cause the below action.

At least a component of force of this tension causes a force in the direction for binding the front sheet 31 with the re-inforcing sheet 20. The force also causes a force in the direction for bindings the Fresnel sheet 11 with the re-inforcing sheet 20.

FIGS. 15(a) to 15(f) indicate the case where an elongated screen block of more than one row is composed of the elongated re-inforcing sheet 20, unit Fresnel sheet 11 and elongated front sheet 31 as illustrated in FIG. 10. As described earlier in reference to FIG. 13, the re-inforcing sheet 20 can be omitted for the composition of one row and m columns. In that case, in FIGS. 15(d), 15(e) and 15(f), the sheet 20 should be regarded as a Fresnel sheet, and the sheet 11 should be omitted.

When a unit screen includes another sheet 16 illustrated in FIG. 3, the sheet 16 should be inserted between the Fresnel sheet 11 and the front sheet 31 in FIGS. 15(a) to 15(f).

Figure 17:
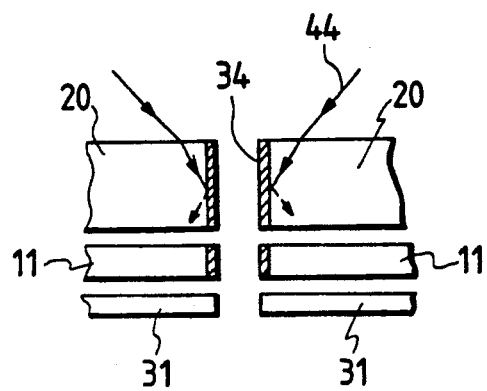
FIG. 17 is a horizontal sectional view of a boundary part between left and right unit-screens, illustrating stray light elimination means.

FIG. 17 is a horizontal sectional view of stray light elimination means in a boundary part between two unit-screens adjacent to each other in the horizontal direction (i.e. left and right unit-screens). In FIG. 17, reference numerals 20, 11 and 31 denote a re-inforcing sheet, Fresnel sheet and front sheet respectively. A reference numeral 34 denotes the left or right end provided with a black tape or a black paint. A reference numeral 44 denotes the stray light from the projectors. Unless blacking is provided for the left and right ends of the re-inforcing sheet 20, the projected light is totally reflected according to optical physics, so a spurious image appears on the screen. The blacking application prevents the spurious image from occurring. The same blacking of side surface is also applied to the ends of a unit Fresnel sheet 11.

Figure 18:
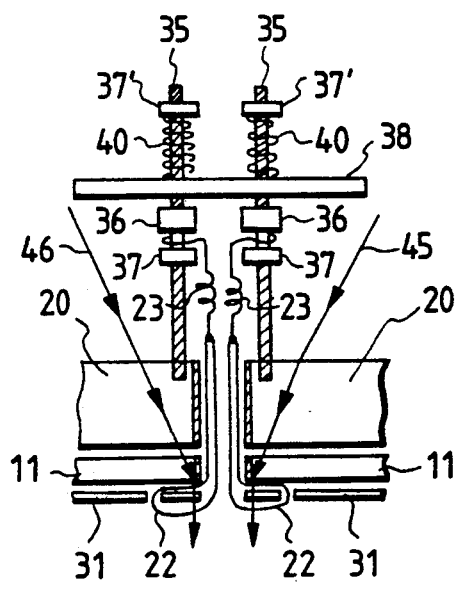
FIG. 18 is a horizontal sectional view of a boundary part between left and right unit-screens, illustrating a variation of supporting members.

FIG. 18 is a horizontal sectional view of a variation of the above noted rigid support body 24. In FIG. 18, reference numerals 20, 11, 31, 22 and 23 denote the same as described earlier. Reference numerals 35, 36 and 37 denote a variation of a rigid support body 24. The reference numeral 35 denotes a two-sided screw about 60 mm long and about 1 mm in diameter. The reference numeral 36 denotes a screw head provided in the middle of the screw 35. The reference numeral 37 denotes a nut. An end of the screw 35 is fastened to a screw hole formed in the edges of left and right re-inforcing sheets 20. An end of a coil spring 23 is fastened to the screw 35 with the nut 37. A reference numeral 45 in FIG. 18 denotes the light on the left edge of the right screen. A reference numeral 46 denotes the light on the right edge of the left screen. The space behind light 45 and 46 is the free space 42 illustrated earlier in FIG. 12. Therefore, all the parts denoted by reference numerals 23, 35, 36, 37 and 38 are in the free space. Yet, a little unnecessary stray light is present in this free space also.

Figure 19:
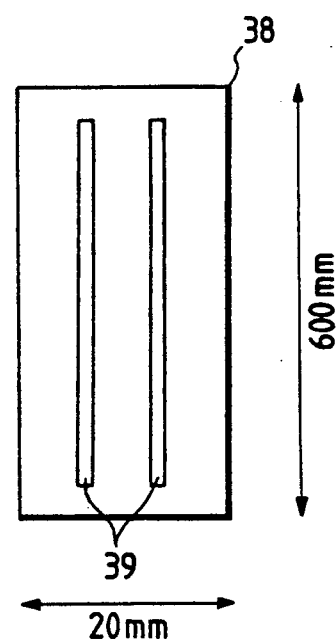
FIG. 19 is an elevational view of the light shielding member illustrated in FIG. 18.

The reference numeral 38 in FIG. 18 denotes a light shielding member about 1 mm thick of metal or plastic material for shielding the stray light. FIG. 18 is a horizontal sectional view as noted earlier. FIG. 19 is an elevational view of the light shielding member 38. In FIG. 19, a reference numeral 39 denotes a slit about 1.5 mm wide. The slit 39 is penetrated by screws 35 (1 mm in diameter) illustrated earlier in reference to FIG. 18. The width of the light shielding member 38 is specified as the width, about 20 mm of the free space where the member is located. Its length is specified as equal to the height of the unit Fresnel sheet. In FIG. 18, the light shielding member 38 is fastened with nuts 37' and springs 40 to screws 35. In addition to shielding stray light, the light shielding member 38 has a function of preventing an irregular deformation of the re-inforcing sheets 20 forward or backward (perpendicularly to the screen). The springs 40 are for preventing screws 35 being damaged by an accidental force.

So much for the description of stray light shielding means for a boundary part between left and right components. The same means is applied to the stray light shielding for a boundary part between upper and lower unit-Fresnel sheets.

Figure 20:
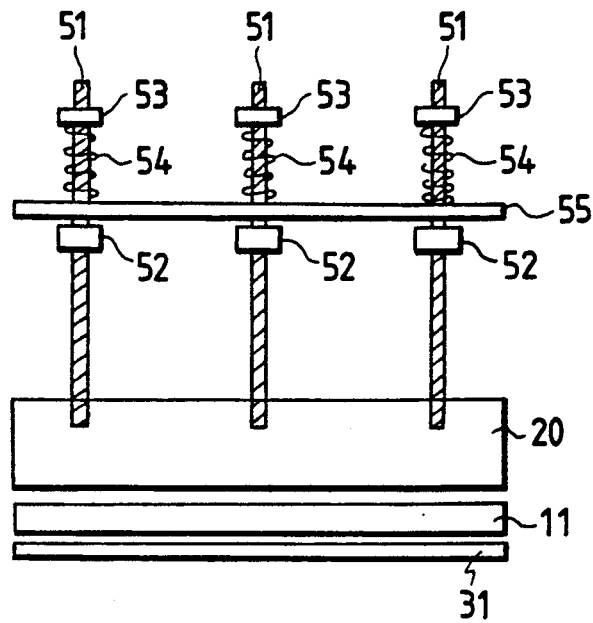
FIG. 20 is a plan view of the light shielding means to be employed in a boundary part between upper and lower unit-screens.
Figure 22:
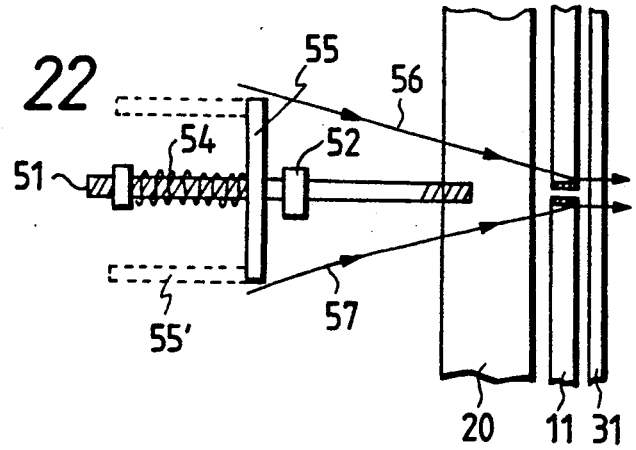
FIG. 22 is a side view of light shielding means illustrated in FIG. 20.

FIGS. 20 and 22 illustrate the stray light shielding means for a boundary part between two unit-Fresnel sheets adjacent to each other in the vertical direction (i.e. upper and lower unit-Fresnel sheets).

Figure 21:
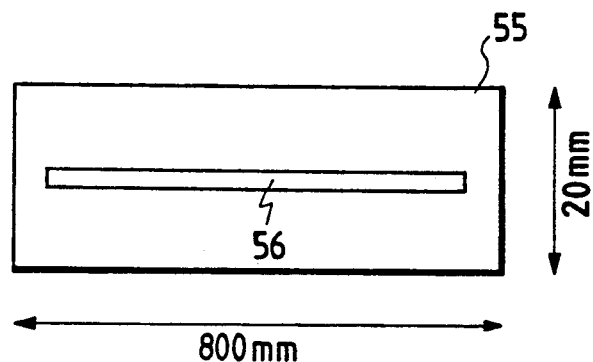
FIG. 21 is an elevational view of a light shielding member to be used for the light shielding means illustrated in FIG. 20.

FIG. 20 is a plan view of this stray light shielding means, and FIG. 22 is a side elevation of this means. A reference numeral 55 denotes a light shielding member whose detail is illustrated in FIG. 21. FIG. 21 is a view depicting the front of the light shielding member 55 which is parallel to the screen, namely an elevational view. The width of the light shielding member 55 is specified as equal to that of the unit Fresnel sheet 11, about 800 mm. The height of the light shielding member 55 is specified as that of the free space, about 20 mm, at the location of the member. A slit 56 in FIG. 21 is about 1.5 mm wide and is for screws.

Referring again to FIGS. 20 and 22, a reference numeral 51 denotes a two-sided screw which is the same as 35 described earlier in reference to FIG. 18. A reference numeral 52 denotes a head of the screw. An end of the two-sided screw 51 is fastened to a screw hole formed in the re-inforcing sheet 20. Reference numerals 54 and 53 denote a spring and a nut, respectively. Reference numerals 56 and 57 in FIG. 22 denote lower effective light from the upper projector and upper effective light from the lower projector, respectively. The area between light rays 56 and 57 is the free space where no effective light is in existence. The light shielding member 55 may be provided with plates 55' for the purpose of reinforcement and light shielding.

So much for the description of stray light shielding means for the boundary part between upper and lower unit-Fresnel sheets.

Figure 23:
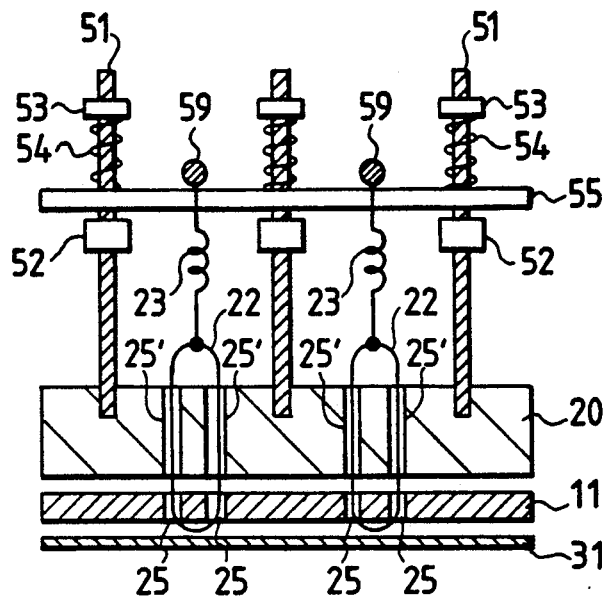
FIG. 23 is a horizontal sectional view of a unit screen illustrating a structure for supporting the upper and lower edges of a unit screen with wires.

FIG. 23 illustrates a structure for supporting the upper and lower edges of a unit Fresnel sheet with wires. FIG. 23 is a horizontal sectional view. Parts other than those denoted by reference numerals are the same as described earlier in reference to FIG. 20. Reference numerals 22 and 23 denote a wire and a coil spring, respectively, which are the same type as described earlier in reference to FIG. 4. Reference numeral 25 denotes a hole formed in the Fresnel sheet 11 to run the wire 22 through. A reference numeral 25' denotes a hole formed in the re-inforcing sheet 20 to run the wire through. It is not necessary to align the holes 25 and 25' in height. The holes 25' in the re-inforcing sheet may be formed on a line corresponding to the boundary between upper and lower Fresnel sheets 11. The holes in the Fresnel sheet should be formed along the upper and lower edges of the Fresnel sheet 11. In this manner, not only can a force be provided by way of the tension of wires 22 in the direction for binding the upper and lower edges of the Fresnel sheet to the re-inforcing sheet, but a component of force can also be provided in the direction for stretching each Fresnel sheet in the vertical direction. The component of force has the effect of giving a good appearance to the Fresnel sheet 11 by preventing it from creasing.

Incidentally, FIG. 23 shows only two coil springs 23, but the number of the spring can be specified according to the size and depth of the Fresnel sheet.

In the description of the spring support mechanism of the present invention, springs are used to support each of the peripheral four sides of a unit Fresnel sheet. However, the lower side can be free from such support, because gravity causes the side to stretch naturally unless the Fresnel sheet is too thin.

On the other hand, the upper side can be supported by inserting the screw fastened to the re-inforcing sheet 20 into a hole in the Fresnel sheet instead of using springs. Therefore, the requirement of the present invention consists in using a mechanism of wires and springs to support those edges of two or more unit screens composing a multi-screen which are adjacent to each other in the horizontal direction.

Figure 24:
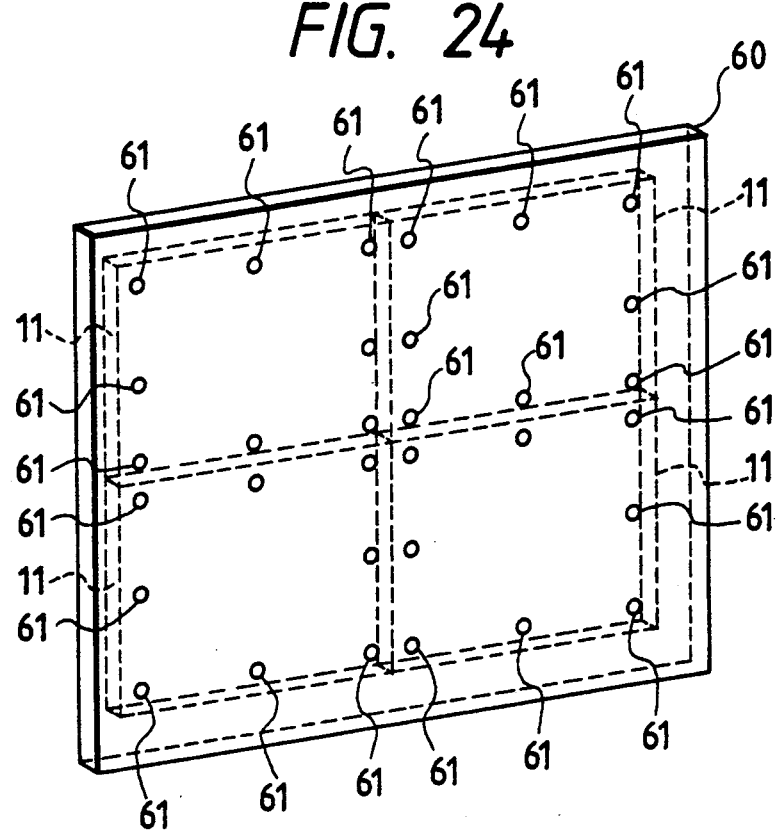
FIG. 24 is a perspective view of the multi-screen in the fifth embodiment of the present invention.

FIG. 24 illustrates the multi-screen of the fifth embodiment of the present invention. The embodiment in FIG. 24 is conditioned on the presence of an enormous front sheet. The enormous front sheet is produced by gluing the left and right edges of an elongated front sheet on each other. Though the gluing is difficult, an example of the production is already in existence.

In FIG. 24, a reference numeral 60 denotes such a front sheet. Vertical lenticular-stripes are formed on the front and rear surfaces of this front sheet 60 and vertical black-stripes on the front surface, just as in the case of the front sheet in FIG. 2. A reference numeral 11 denotes a unit Fresnel sheet whose depth is about 1 mm or less and less than that of the front sheet 60. The Fresnel lens surface is located on its projection surface, namely the surface in contact with the front sheet 60. FIG. 24 illustrates the case where a total of four unit-Fresnel sheets 11 are used in two rows and two columns. The unit Fresnel sheets 11 are supported by the front sheet 60 by way of screws 61 illustrated in FIG. 24 in each adjacent part in the method whose detail is illustrated in FIG. 25, the shielding of stray light being achieved at the same time.

The front sheet 60, as in prior art, fastened with an enormous screen frame.

The screws 61 to be used total eight for every unit-Fresnel sheet whose diagonal is about 40 inch size.

Figure 25:
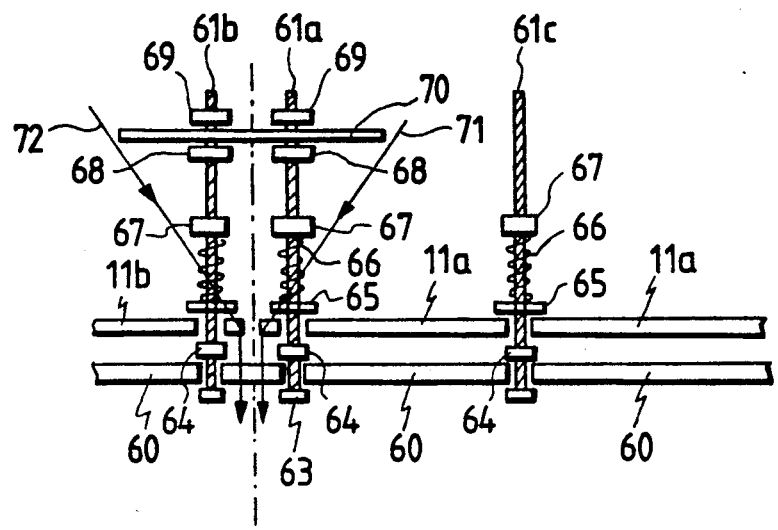
FIG. 25 is a horizontal sectional view of the multi-screen illustrated in FIG. 24.

FIG. 25 illustrates a horizontal sectional view taken along the upper edges of the unit Fresnel sheets of the multi-screen in FIG. 24. In FIG. 25, the reference numeral 60 denotes the front sheet, and a reference numeral 11a designates a right unit-Fresnel sheet, 11b a left unit-Fresnel sheet, 61a the screw in the upper left corner of the right Fresnel sheet 11a, 61c the screw in the upper center of the right Fresnel sheet 11a, 61b the screw in the upper right corner of the left Fresnel sheet 11b and 63 a head of the screw 61a. The diameter of the screws 61a, 61b and 61c is almost the same as the pixel size and is about 1 mm, and their length is about 50 mm. Reference numerals 64 and 65 denote a nut and a washer of transparent metacrylic resin, respectively, and a reference numeral 66 designates a spring, 67 a nut, 68 and 69 also nuts, 70 a stray light shielding member of nontransparent resin, 71 an effective ray of light along the limit in the upper left corner of the right projector and 72 an effective ray of light along the limit in the upper right corner of the left projector. The area behind the effective rays of light (upper part of the figure) is the free space where no effective light is present. In this area, a little stray light is present despite the absence of effective light.

The screws 61 are fastened to the front sheet 60 with nuts 64. The nuts 67 cause compressive stress to be provided for springs 66, and the compressive stress is conveyed by way of transparent washers 65 to the unit Fresnel sheets 11. Thus, the unit Fresnel sheets 11 is bound in the direction of the front sheet 60. The nuts 68 and 69 support the light shielding member 70 between them. The light shielding member 70 is only for the purpose of light shielding, so a thickness about 0.1 mm for the member is enough. The elevational view of the member 70 is the same as FIG. 19.

The diameter of the holes for the screws 61 should be about twice as large as that of the screws which is 1 mm. This helps to prevent the unit Fresnel sheets 11 from deforming due to the difference in expansion and contraction between the Fresnel sheets 11 and the front sheet 60. Namely, the Fresnel sheets 11 are structured so that they can slide a little in the left and right directions.

The one-dimensional curvature of the unit Fresnel sheet 11 to be used for the fifth embodiment should be polarized opposite to that described in reference to FIG. 5. It is because in reference to FIG. 5 the object is to bind the unit Fresnel sheet 11 with the re-inforcing sheet 20 located behind it while in the fifth embodiment the object is to bind the Fresnel sheet 11 with the front sheet 60 in front of it.

However, a common expression, "A one-dimensional curvature polarized so that the peripheral parts will be apart from each other in the unloaded state is provided." is possible in both cases.

So much for the description of the supporting mechanism and stray light shielding mechanism in an adjacent part between left and right unit Fresnel sheets in the fifth embodiment of the present invention.

The mechanism at the adjacent edges of two unit-Fresnel sheets adjacent to each other in the vertical direction (i.e. upper and lower unit-Fresnel sheets) is the mechanism described earlier in reference to FIG. 25 turned 90°. Therefore, the description is omitted here.

In the fifth embodiment also, the vertical diffusion sheet described earlier (sheet 16 in FIG. 3) can be inserted between the Fresnel sheet 11 and front sheet 60.

The below description is about a variation of the one-dimensional curvature for the unloaded state of the elongated front sheet 31 or unit front sheet 12 to be used in the first, second, third, fourth and sixth embodiments of the present invention. This variation is applicable to the unit Fresnel sheet, too.

The one-dimensional curvature is of vertical cylinder in the first, second, third, fourth and sixth embodiments. However, it can be of horizontal cylinder, instead. The reason is that when a sheet shaped like a roll of horizontal cylinder is forcibly stretched into a flat plane in the vertical direction, a stress for deformation into a vertical cylinder occurs with Poisson's ratio according to strength of materials.

In general, let an elastic sheet of uniform thickness be provided with a one-dimensional curvature Ky for the unloaded state of a horizontal cylinder, then the horizontal cylinder profile is given by:

$$z = \frac{Ky}{2} y^2$$

where y and z are a coordinate in the vertical direction and a coordinate in a direction perpendicular to the screen, respectively, both illustrated in FIG. 5.

When the sheet of horizontal cylinder is provided with the torque to cancel the curvature Ky at the upper and lower edges, the horizontal cylinder is stretched into a flat plane in the vertical direction. But the sheet changes into the shape of vertical cylinder indicated by the following equation:

$$z = \frac{\sigma Ky}{2} x^2$$

where x is a horizontal direction coordinate.

The above equation signifies that the one-dimensional curvature changes into a vertical cylinder equal to $\sigma$ Ky. The value of $\sigma$ about 0.4 in the case of metacrylic or polystyrene material.

The above change is a phenomenon often experienced when a roll of photographic film is stretched.

Therefore, the direction of the one-dimensional curvature for the unloaded state of the front sheet and the Fresnel sheet can be either vertical or horizontal.

The concept of one-dimensional curvature in the present invention means a plane which can be extended into a flat plane. In other words, it means a plane whose Gaussian total curvature which is given mathematically by Kxly is zero.

If the total curvature is not zero, the concept means a spherical plane or a saddle plane, so flat binding is not possible even by using the spring mechanism of the present invention. Therefore, a sheet whose total curvature is around zero in the unloaded state should be used for the sheets composing the unit screen, according to the present invention.

The present invention is applicable to not only the case where the unit projector (each of 1, 2, 3 and 4 in FIG. 1) is a CRT projector but the case where the unit projector is a projector utilizing a liquid crystal panel.

The description of the embodiments so far presented is centered on the case the elongated front sheet (in FIGS. 10 and 11) is used.

The description below is about the sixth and seventh embodiments where nm unit front sheets 12 of ordinary 40 inch size (FIG. 13) are used.

Figure 26:
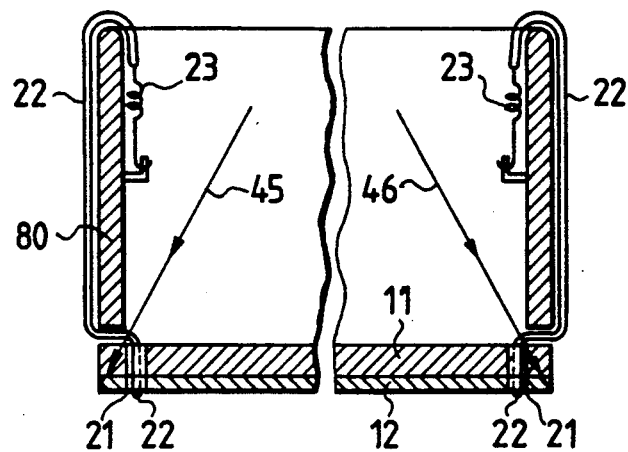
FIG. 26 is a horizontal sectional view of the unit screen block composed of a unit screen and its support members in the sixth embodiment of the present invention.
Figure 27:
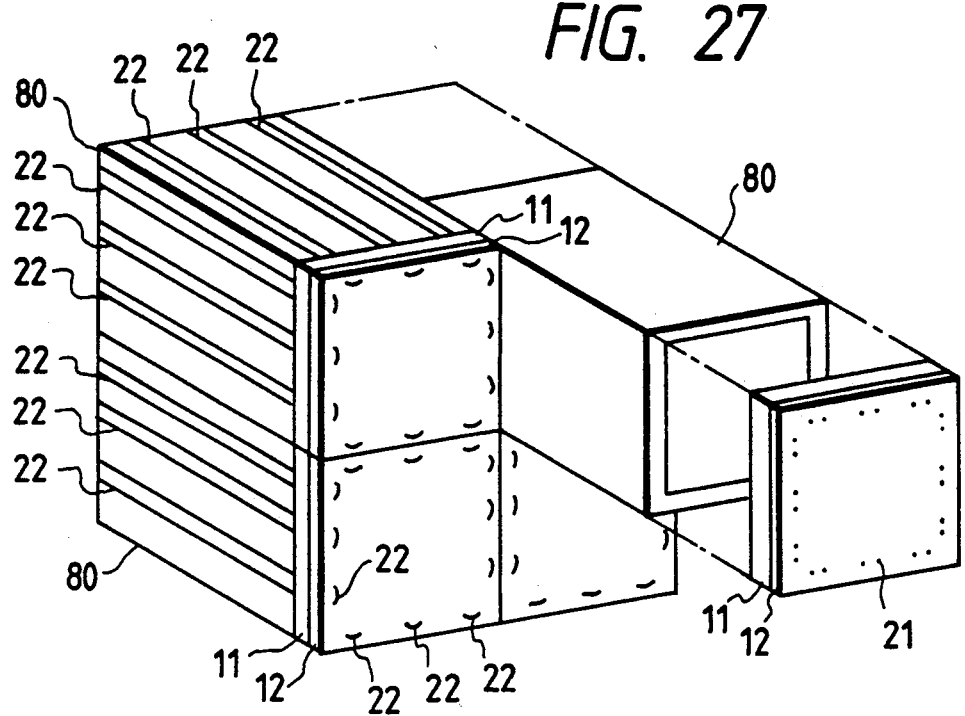
FIG. 27 is a perspective view of the multi-screen of the sixth embodiment of the present invention.

FIGS. 26 and 27 are a horizontal sectional view of a unit block of the multi-screen and a perspective view of the whole multi-screen, respectively, both in the sixth embodiment of the present invention.

In the sixth embodiment, the multi-screen is, as illustrated in FIG. 27, composed by employing a cassette system to accumulate m columns and n rows of unit blocks each of which is the Fresnel sheet 11 and front sheet 12 mounted to a support body 80 illustrated in FIG. 26 by means of the wires 22 and coil springs 23 illustrated in FIG. 13 in the fourth embodiment.

Vertical lenticular-stripes are formed on the front and rear surfaces of the front sheet 12 and vertical black-stripes on the front surface, just as in the case of the front sheet in FIG. 2.

Figure 28:
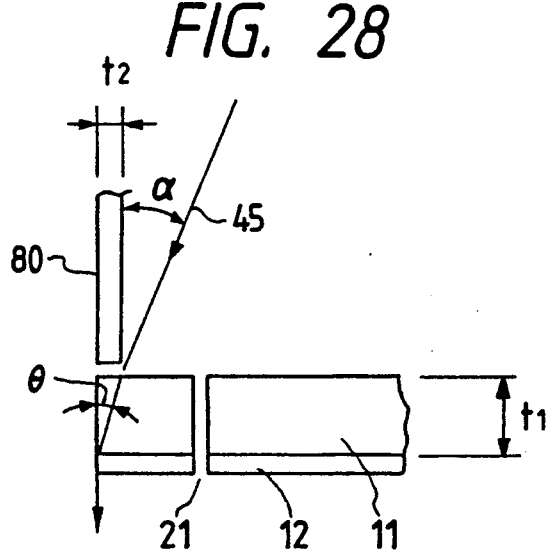
FIG. 28 is an enlarged view of part of FIG. 26.

In FIG. 26, the unit block is composed by using wires 22 and coil springs 23 by way of holes 21 formed on the periphery of the Fresnel sheet 11 and front sheet 12 to pull the unit screen for its installation toward the periphery of the support body 80 of box type placed in the free space 42 illustrated in FIG. 12 behind the rays of light described in reference to FIG. 18. FIG. 28 is an enlarged view of part of FIG. 26. Assuming the distance d between lenses of a projector 1 in FIG. 12, distance between lens and screen 1 (projection distance) in FIG. 12 and width of a 40 inch screen W to be 130 mm, 800 mm and 814 mm respectively, the incident angle $\alpha$ of the ray of light 45 in FIG. 28 is given by:

$$\alpha = \tan^{-1}\{(W/2-d)/l\}$$

$$\therefore \alpha = \tan^{-1}\{(814/2-130)/800\} = 19.1°$$

Let the refractive index n of the Fresnel sheet 11 be 1.5, then according to Snell's law the angle $\alpha$ whose arms are a perpendicular to the Fresnel sheet 11 and the ray of light 45 passing through the Fresnel sheet is given by:

$$\sin \alpha = n \sin \theta$$

$$\therefore \theta = \sin^{-1}\left(\frac{\sin \alpha}{n}\right)$$

$$\therefore \theta = \sin^{-1}\left(\frac{\sin 19.1°}{1.5}\right) = 12.6°$$

Let the depth $t_1$ of the Fresnel sheet 11 be 5 mm, then the plate thickness of the support body 80 for ensuring that the body is in the free space is given by:

$$t_z \leq 5 \tan 12.6° = 1.1 \text{ mm}$$

Therefore, an iron or aluminum plate can be used to produce a support body 80 of box type.

Figure 29A:
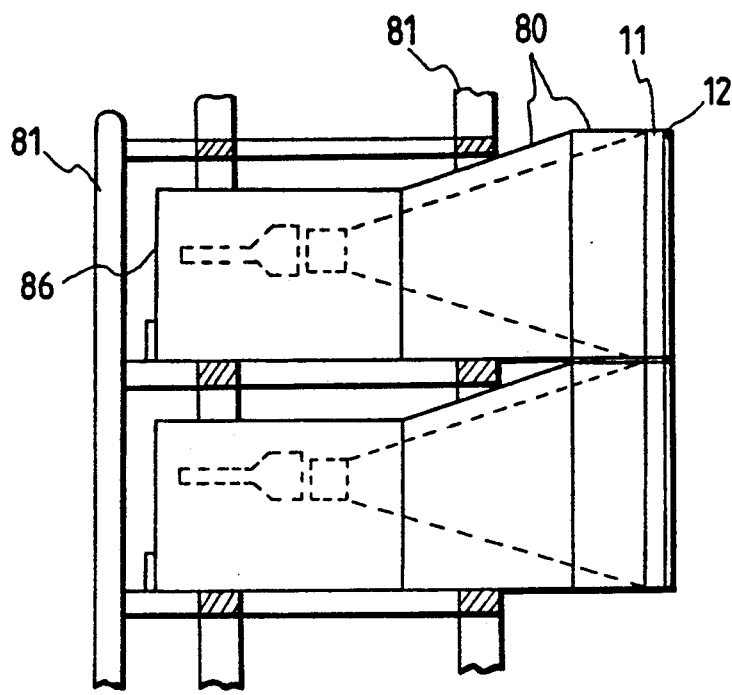
FIGS. 29(a) and 29(b) are a side view and a plan view respectively of the seventh embodiment of the present invention.
Figure 29B:
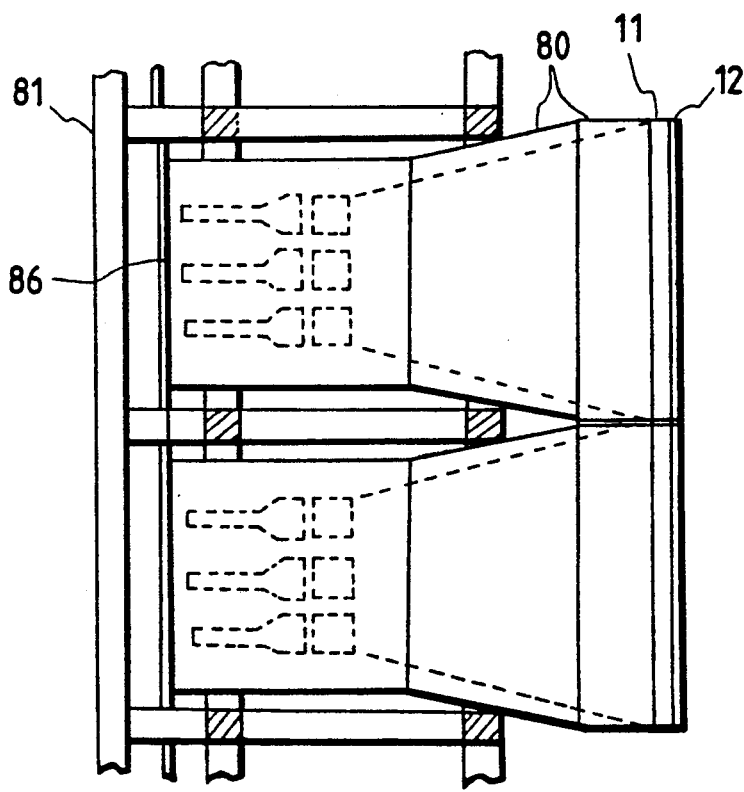
Figure 30:
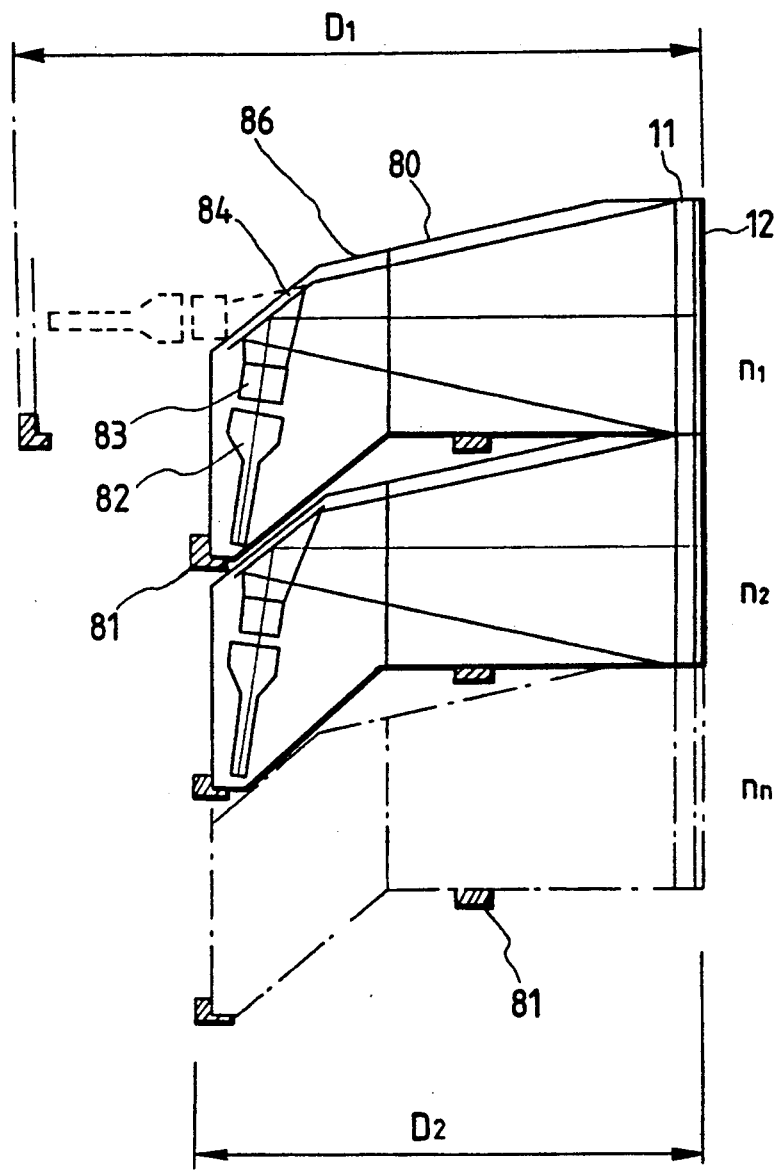
FIG. 30 is a side view of the eighth embodiment of the present invention.

FIGS. 29(a), 29(b) and 30 illustrate the seventh and eighth embodiments where changes are made in configuration of the support body 80 of box type in FIG. 27.

FIG. 29(a) illustrates a side view of the seventh embodiment, and FIG. 29(b) a plan view of the seventh embodiment. In the embodiment, the rear of the support body 80 of box type and a box 86 for housing a unit projector are smaller in size. This allows each unit block to be mounted on a structure 81 of such material as iron square pipes which is installed in advance in a building and arranged in n rows and m columns.

FIG. 30, showing the eighth embodiment of the present invention, illustrates and the arrangement when the projection distance is long between a lens 83 and the screen. The light emitted from a cathode-ray tube 82 is magnified by the lens 83, reflected by a mirror 84 and projected on the screen. This arrangement shortens the depth of a support body 80 of box type. For instance, when the screen is 40 inch size with the projection distance $l=1.2$ m, $D_1$ will be around 1.8 m. But in the embodiment, $D_2$ can be not more than 1.3 m.

As described above, in the sixth, seventh and eighth embodiments also, unit screens can be closely bound, and this makes a multi-screen where there is no conspicuous boundary band between adjacent pictures possible.

Figure 31:
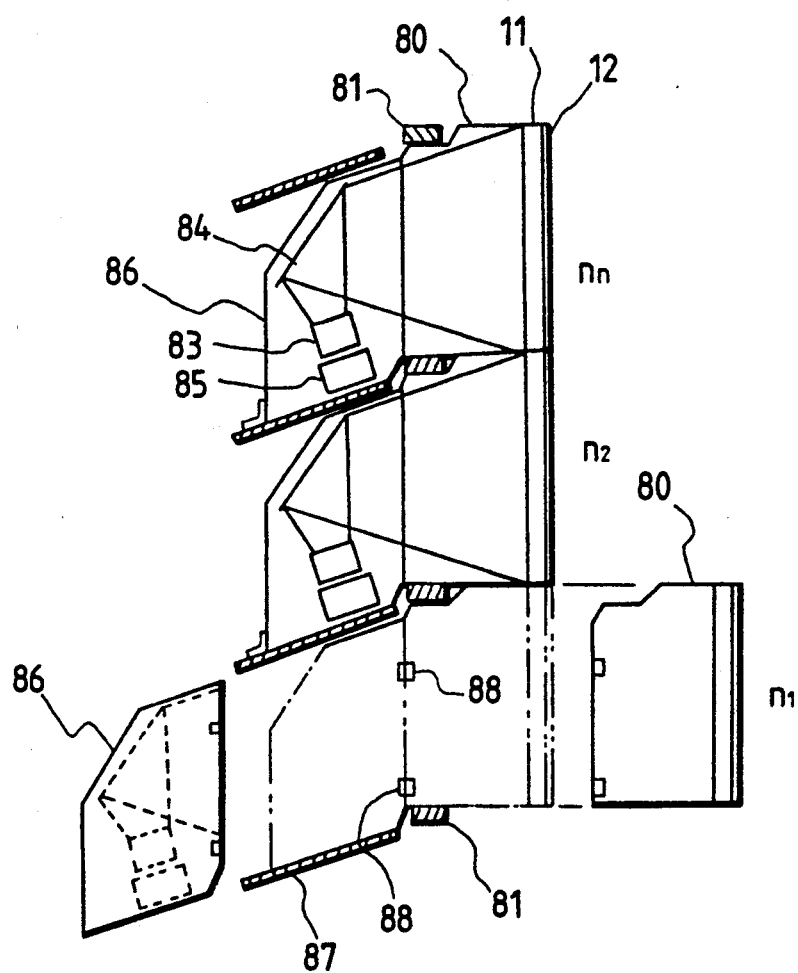
FIG. 31 is a side view of the ninth embodiment of the present invention.

FIG. 31 illustrates a side view of the ninth embodiment of the present invention.

In the ninth embodiment, a liquid crystal display projector is employed as a unit projector in the unit screen block composed as in FIG. 26 of the Fresnel sheet 11 and the front sheet 12 mounted to the support body 80 of box type illustrated in FIG. 26. (In FIG. 31, wires 22 and coil springs 23 are omitted for simplification of illustration.) In FIG. 31, the light rays emitted from a liquid crystal panel and light source 85 are magnified by a lens 83, reflected by a mirror 84 and projected on the unit screen. Since the liquid crystal panel and light source 85 is shorter than the cathode-ray tube 82 illustrated in FIG. 30, the use of the mirror 84 to reflect light permits very compact composition.

In the ninth embodiment, inside the compact unit block described above, a unit projector 86 is inserted and removed individually from behind on rails 87 installed in advance in the building, and the support body 80 of box type is inserted for installation into the upper and lower structures 81 installed in advance in the building and removed from the structures both individually from the front.

A unit projector 86 and a support body 80 of box type are connected to each other with fixing metals 88.

Figure 32:
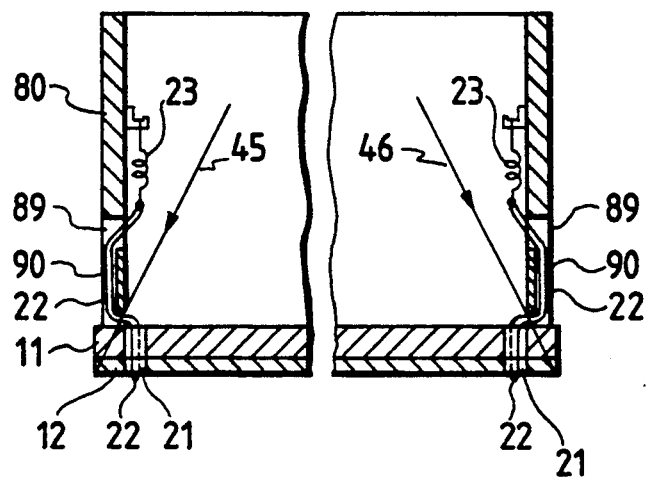
FIG. 32 is a horizontal sectional view of a variation of the unit screen block illustrated in FIG. 26.

FIG. 32 illustrates another structure of the support body 80 of box type equipped with the Fresnel sheet 11 and front sheet 12 by means of wires 22 and coil springs 23 in the sixth and ninth embodiments.

In FIG. 32, a wire 22, pulled by the coil spring 23, guided by an opening 89 into the support body 80 and directed out of the body, pulls the screen composed of the Fresnel sheet 11 and front sheet 12. The part of the outside surface of the support body 80 of box type on which the wire 22 runs should be a concave groove 90 so that the wire 22 cannot be scratched and torn when the support bodies 80 of box type are piled up.

Figure 33:
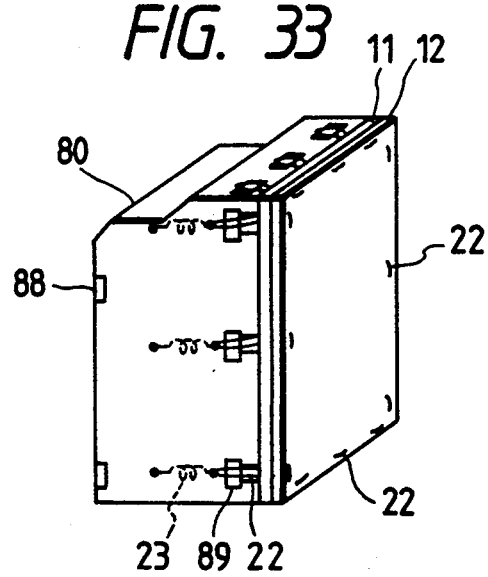
FIG. 33 is a perspective view of the unit screen block illustrated in FIG. 32.

FIG. 33 is a view of the appearance of the support body 80 of box type illustrated in FIG. 31 which uses the structure illustrated in FIG. 32. As illustrated in FIG. 33, since the wires 22 are stretched so as to pull the Fresnel sheet 11 and front sheet 12 toward outside the support body 80 of box type, the screen can be retained squarely on the front of the support body 80.

In the sixth to ninth embodiments also, the whole enormous screen can be of concave cylinder (vertical or horizontal) as in FIG. 12.

As described above, in the ninth embodiment also, the unit screens can be closely bound, and this makes a multi-screen where there is hardly any conspicuous boundary band between adjacent pictures possible.

So much for the description of the ninth embodiment.

According to the present invention, it is possible to provide a quality enormous multi-screen projector with very little discontinuity in a boundary part between unit-screens.

We claim:

1. A multi-screen projector comprising:
   n×m unit projectors arranged horizontally in m columns and vertically in n rows like a matrix, where n and m are positive integers either of which is two or more;
   transmisive screen means comprised of a plurality of sheets including at least n×m Fresnel sheets and m or n×m front sheets having lenticular stripes for diffusing the light horizontally, said transmissive screen means being formed by a plurality of unit screens each of which is composed of layers of sheets including at least a Fresnel sheet and a front sheet; and
   spring means;
   wherein one of two sheets included in said layers of sheets composing said each of unit screens is provided with the shape having a one-dimensional curvature for separating the peripheries of the two sheets in the unloaded state when the centers of the two sheets are in touch with each other, and
   said spring means provides a force to pull the peripheries of said two sheets toward each other for said one of the two sheets.

2. A multi-screen projector as claimed in claim 1, wherein said layers of sheets composing said each of unit screens are a front sheet on a Fresnel sheet on a re-inforcing sheet facing an observer, said two sheets are the front sheet and the re-inforcing sheet, and said one of said two sheets is the front sheet.

3. A multi-screen projector as claimed in claim 2, wherein said front sheet and re-inforcing sheet are larger in size than said Fresnel sheet.

4. A multi-screen projector as claimed in claim 3, wherein said front sheet and re-inforcing sheet are elongated sheets vertically at least about twice as long as said Fresnel sheet.

5. A multi-screen projector as claimed in claim 2, wherein wires smaller in diameter than the pixel size are connected to the left and right sides of said front sheet, said spring means provides the wires with tension with supporting means as its support, and the force of said spring means is thus provided as the tension by way of the wires for said front sheet.

6. A multi-screen projector as claimed in claim 5, wherein said supporting means are located in the space where there is no light projected on said unit screen by said unit projector, and a stray light shielding member is mounted to said supporting means.

7. A multi-screen projector as claimed in claim 1, wherein said unit screens are arranged so that said transimmisve screen means forms part of a concave cylindrical surface.

8. A multi-screen projector as claimed in claim 1, wherein said n is one, said layers of sheets composing said each of unit screens are two layers of a front sheet on a Fresnel sheet facing an observer, wires smaller in diameter than the pixel size are connected to the left and right sides of said front sheet, said spring means provides the wires with tension with supporting means as its support, and the force of said spring means is thus provided as the tension by way of the wires for said front sheet.

9. A multi-screen projector as claimed in claim 8, wherein said supporting means are located in the space where there is no light projected on said unit screen by said unit projector, and a stray light shielding member is mounted to said supporting means.

10. A multi-screen projector as claimed in claim 1, wherein a sheet for diffusing the light in the vertical direction is provided between said front sheet and Fresnel sheet.

11. A multi-screen projector as claimed in claim 2, wherein a sheet for diffusing the light in the vertical direction is provided between said front sheet and Fresnel sheet.

12. A multi-screen projector as claimed in claim 8, wherein a sheet for diffusing the light in the vertical direction is provided between said front sheet and Fresnel sheet.

13. A multi-screen projector comprising:
    n×m unit projectors arranged horizontally in m columns and vertically in n rows like a matrix, where n and m are positive integers either of which is two or more;
    transmissive screen means comprised of a plurality of sheets including at least n×m Fresnel sheets and a plane front sheet having lenticular stripes for diffusing the light horizontally, said transmissive screen means being formed by a plurality of unit screens, said front sheet being used to compose said plurality of unit screens in common, each of said unit screens being composed of layers of sheets including at least a Fresnel sheet and said front sheet used in common; and
    spring means;
    wherein each of said Fresnel sheets is provided with the shape having a one-dimensional curvature for separating the periphery of said each of Fresnel sheets from said front sheet in the unloaded state when the center of said each of Fresnel sheets is in touch with said front sheet, and
    said spring means provides a force to pull the periphery of said each of Fresnel sheets toward said front sheet for said each of Fresnel sheets.

14. A multi-screen projector as claimed in claim 13, wherein a sheet for diffusing the light in the vertical direction is provided between said front sheet and Fresnel sheet.

15. A multi-screen projector as claimed in claim 13, wherein said unit screens are arranged so that said transmissive screen means forms part of a concave cylindrical surface.

16. A multi-screen projector as claimed in claim 13, wherein a stray light shielding member is mounted to said spring means.

17. A multi-screen projector as claimed in claim 1, wherein assuming said one-dimensional curvature to be expressed as a function of the positional coordinates of a unit screen, the function is composed of a term of principal one-dimensional curvature and a term having the differential coefficient of second order whose polarity is opposite to that of principal one-dimensional curvature.

18. A multi-screen projector as claimed in claim 13, wherein assuming said one-dimensional curvature to be expressed as a function of the positional coordinates of a unit screen, the function is composed of a term of principal one-dimensional curvature and a term having the differential coefficient of second order whose polarity is opposite to that of principal one-dimensional curvature.

19. A multi-screen projector as claimed in claim 1, wherein said two sheets included in said layers of sheets composing said each of unit screens are a front sheet having lenticular-stripes for diffusing the light in the horizontal direction and a Fresnel sheet, wires smaller in diameter than the pixel size are connected to the periphery of said front sheet, said spring means provides the wires with tension with supporting means of box type as its support, and the force of said spring means is thus provided as the tension by way of the wires for said front sheet so that said periphery of front sheet is pressed on the opening of said supporting means of box type by way of said Fresnel sheet.

20. A multi-screen projector as claimed in claim 19, wherein said supporting means of box type is connected to a box for housing the unit projector.

21. A multi-screen projector as claimed in claim 20, wherein mirror means for bending a path of light projected by said unit projector is disposed in said box for housing the unit projector.

22. A multi-screen projector as claimed in claim 19, wherein said unit screens are arranged so that said transmissive screen means forms part of a concave cylindrical surface.

23. A multi-screen projector as claimed in claim 2, wherein black-stripes are formed on said front sheet.

24. A multi-screen projector as claimed in claim 8, wherein black-stripes are formed on said front sheet.

25. A multi-screen projector as claimed in claim 13, wherein black-stripes are formed on said front sheet.

26. A multi-screen projector as claimed in claim 19, wherein black-stripes are formed on said front sheet.

* * * * *